(12) United States Patent
Khan et al.

(10) Patent No.: US 11,334,486 B2
(45) Date of Patent: May 17, 2022

(54) DETECTION CIRCUITRY

(71) Applicant: ARM LIMITED, Cambridge (GB)

(72) Inventors: Adnan Khan, Cambridge (GB); Alex James Waugh, Cambridge (GB); Jose Gonzalez-Gonzalez, Cambridge (GB)

(73) Assignee: ARM LIMITED, Cambridge (GB)

( * ) Notice: Subject to any disclaimer, the term of this patent is extended or adjusted under 35 U.S.C. 154(b) by 38 days.

(21) Appl. No.: 16/305,165

(22) PCT Filed: Apr. 27, 2017

(86) PCT No.: PCT/GB2017/051182
§ 371 (c)(1),
(2) Date: Nov. 28, 2018

(87) PCT Pub. No.: WO2017/220956
PCT Pub. Date: Dec. 28, 2017

(65) Prior Publication Data
US 2019/0340124 A1 Nov. 7, 2019

(30) Foreign Application Priority Data
Jun. 21, 2016 (GB) ..................... 1610789

(51) Int. Cl.
*G06F 12/08* (2016.01)
*G06F 12/084* (2016.01)
*G06F 12/0817* (2016.01)
*G06F 12/0831* (2016.01)

(52) U.S. Cl.
CPC ........ *G06F 12/084* (2013.01); *G06F 12/0817* (2013.01); *G06F 12/0833* (2013.01)

(58) Field of Classification Search
CPC .... G06F 9/526; G06F 12/0833; G06F 12/084; G06F 12/0817; G06F 12/0831
See application file for complete search history.

(56) References Cited

U.S. PATENT DOCUMENTS 5,632,025 A 5/1997 Bratt et al.
6,052,763 A * 4/2000 Maruyama .......... G06F 13/1652
711/1

(Continued)

OTHER PUBLICATIONS

B. Gurumurthy, D. Broneske, M. Schäler, T. Pionteck and G. Saake, "An Investigation of Atomic Synchronization for Sort-Based Group-By Aggregation on GPUs," 2021 IEEE 37th International Conference on Data Engineering Workshops (ICDEW), 2021, pp. 48-53.*

(Continued)

*Primary Examiner* — Pierre Miche Bataille
(74) *Attorney, Agent, or Firm* — Nixon & Vanderhye, P.C.

(57) ABSTRACT

An apparatus (300) for processing data comprises a plurality of memory access request sources (102,104) which generate memory access requests. Each of the memory access request sources has a local memory (106,108), and the apparatus also includes a shared memory (110). When the memory access requests are atomic memory access requests, contention may arise over common data. When this occurs, the present technique triggers a switch of processing data in the local memory of a memory access request source to processing data in the shared memory.

17 Claims, 6 Drawing Sheets

(56) References Cited

U.S. PATENT DOCUMENTS

| | | | |
|---|---|---|---|
| 7,680,987 B1* | 3/2010 | Clark | G06F 12/0815 |
| | | | 711/147 |
| 8,417,897 B2 | 4/2013 | Marathe et al. | |
| 8,738,860 B1* | 5/2014 | Griffin | G06F 13/4282 |
| | | | 711/122 |
| 9,632,819 B2* | 4/2017 | Greiner | G06F 12/084 |
| 11,074,113 B1* | 7/2021 | Ivester | G06F 9/52 |
| 11,138,112 B2* | 10/2021 | Jayasimha | G06F 9/30047 |
| 2008/0250213 A1* | 10/2008 | Holt | G06F 11/1658 |
| | | | 711/159 |
| 2012/0036329 A1* | 2/2012 | Coon | G06F 9/30185 |
| | | | 711/152 |
| 2013/0042078 A1 | 2/2013 | Jalal et al. | |
| 2013/0275663 A1* | 10/2013 | Lin | G06F 9/3004 |
| | | | 711/105 |
| 2014/0149703 A1* | 5/2014 | Jones, III | G06F 9/526 |
| | | | 711/163 |
| 2015/0089153 A1 | 3/2015 | Busaba et al. | |
| 2015/0242249 A1 | 8/2015 | Cain, III et al. | |
| 2015/0242307 A1* | 8/2015 | Busaba | G06F 9/528 |
| | | | 711/165 |
| 2015/0278094 A1 | 10/2015 | Ma et al. | |
| 2015/0355851 A1 | 12/2015 | Hinds et al. | |
| 2015/0378778 A1* | 12/2015 | Gschwind | G06F 3/0653 |
| | | | 711/147 |
| 2019/0332529 A1* | 10/2019 | Byrne | G06F 12/0284 |

OTHER PUBLICATIONS

A. Daglis, D. Ustiugov, S. Novaković, E. Bugnion, B. Falsafi and B. Grot, "SABRes: Atomic object reads for in-memory rack-scale computing," 2016 49th Annual IEEE/ACM International Symposium on Microarchitecture (MICRO), 2016, pp. 1-13.*
International Search Report and Written Opinion of the ISA for PCT/GB2017/051182, dated Jul. 25, 2017, 10 pages.
Combined Search and Examination Report for GB Application No. 1610789.8, dated Nov. 25, 2016, 6 pages.

* cited by examiner

|  | Atomic Request Flag | Owner |
|---|---|---|
| Line 0 | 0 | – |
| Line 1 | 1 | CPU A |
| Line 2 | 1 | CPU A |
| Line 3 | 0 | CPU B |

FIG. 6

|  | Count |
|---|---|
| Line 0 | 00 |
| Line 1 | 10 |
| Line 2 | 10 |
| Line 3 | 01 |

| Programmable Threshold |
|---|
| P |

FIG. 7

DETECTION CIRCUITRY

This application is the U.S. national phase of International Application No. PCT/GB2017/051182 filed Apr. 27, 2017 which designated the U.S. and claims priority to GB 1610789.8 filed Jun. 21, 2016, the entire contents of each of which are hereby incorporated by reference.

The present disclosure relates to apparatus for processing data. More particularly, the present disclosure relates to memory access requests within apparatus for processing data.

It is known to provide an apparatus for processing data with a number of memory units. Some memory access requests can cause data transfers between different memory units.

In at least some embodiments the present disclosure provides apparatus for processing data comprising:

a shared memory;

a plurality of memory access request sources to generate memory access requests, each having a local memory to store data to be accessed, at least some of said memory access requests being atomic memory access requests corresponding to atomic memory access operations unobservable in a partially completed form; and contention detection circuitry to detect a predetermined contention condition between atomic memory access requests, generated by differing ones of said plurality of memory access request sources, to common data; wherein when said contention detection circuitry detects said predetermined contention condition, said contention detection circuitry triggers switching from performing an atomic memory access operation upon said common data stored within said local memory to performing said atomic memory access operation upon said common data stored in said shared memory.

In at least some embodiments the present disclosure provides apparatus for processing data comprising:

shared memory means for storing data;

a plurality of memory access request source means for generating memory access requests, each having a local memory means for storing data to be accessed, at least some of said memory access requests being atomic memory access requests corresponding to atomic memory access operations unobservable in a partially completed form; and contention detection means for detecting a predetermined contention condition between atomic memory access requests, generated by differing ones of said plurality of memory access request source means, to common data; wherein when said contention detection means detects said predetermined contention condition, said contention detection means triggers switching from performing an atomic memory access operation upon said common data stored within said local memory means to performing said atomic memory access operation upon said common data stored in said means for shared memory means.

In at least some embodiments the present disclosure provides a method of processing data comprising:

storing data in a shared memory;

generating memory access requests with a plurality of a memory access request sources, each having a local memory to store data to be accessed, at least some of said memory access requests being atomic memory access requests corresponding to atomic memory access operations unobservable in a partially completed form;

detecting a predetermined contention condition between atomic memory access requests, generated by differing ones of said plurality of memory access request sources, to common data; and in response to detecting said predetermined contention condition, triggering a switch from performing an atomic memory access operation upon said common data stored within a local memory to performing said atomic memory access operation upon said common data stored in a shared memory.

BRIEF DESCRIPTION OF THE DRAWINGS

FIG. 6 shows one example of contention criteria in contention detection circuitry; and FIG. 7 shows another example of contention criteria in contention detection circuitry.

DESCRIPTION OF EXAMPLES

Figure 1:
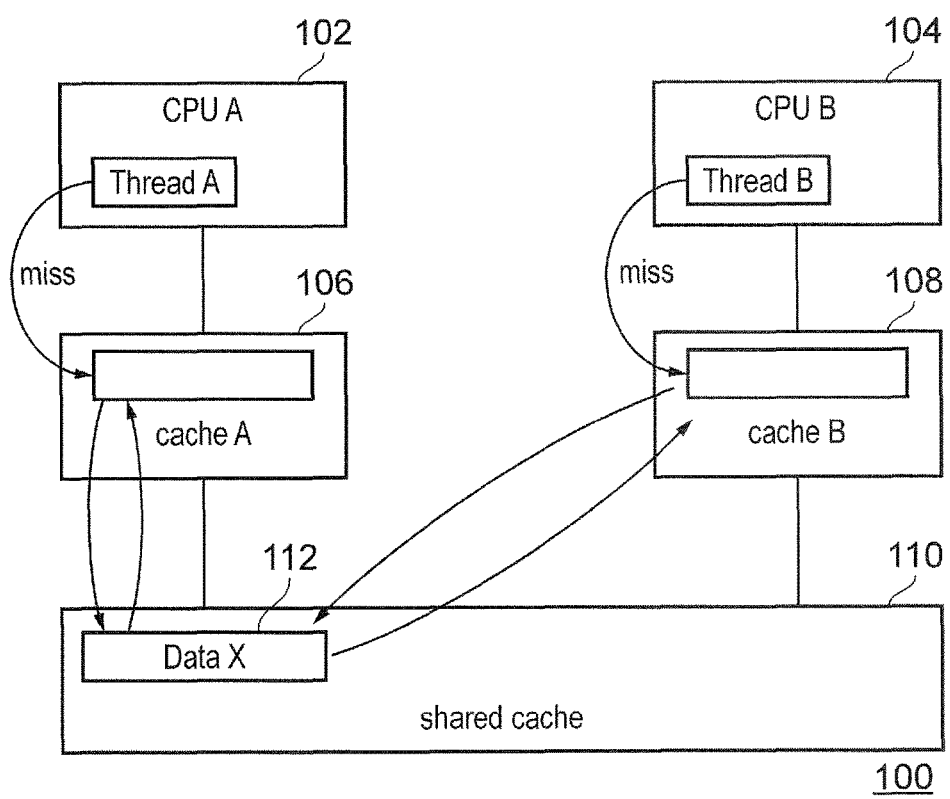
FIG. 1 illustrates a form of cache line entry 'ping-ponging' that may occur in an apparatus having a plurality of CPUs and a cache hierarchy.

Some specific examples will be discussed below. The invention is not limited to these particular examples.

Some apparatus for processing data comprise a plurality of memory access request sources, each having a local memory to store data to be accessed. When at least some memory access requests are atomic memory access requests, the present disclosure recognises that an inefficient transfer of data known as 'ping-ponging' can occur. For example, when two memory access request sources make atomic memory access requests for the same data, the common data could be repeatedly transferred between the local memories of different memory access request sources, and a shared memory, in order to service the atomic memory access requests. To address this problem, the present disclosure provides contention detection circuitry to detect when a predetermined contention condition occurs. In response to the predetermined contention condition, the contention detection circuitry triggers a switch from performing atomic memory access operations in the local memory of a contending memory access request source, to performing the atomic memory access operation in the shared memory. In this way, the requested data is not transferred to and from the local memories of each of the contending sources as they make the atomic memory access requests. This reduces the processing resources expended on data transmissions and improves the efficiency of the data processing apparatus.

One approach for triggering the switch includes storing the common data in an exclusive form within the shared memory. In this way, the atomic memory access operation may be performed in the shared memory, and thus the transfer the data to and from the local memories of the contending memory access sources can be reduced.

In some examples, the plurality of memory access request sources includes a plurality of processors to execute respective program instructions. In such examples, at least two of the processors may make atomic memory access requests to common data and cause contention that would otherwise lead to 'ping-ponging'.

In other examples, the plurality of memory access request sources include a plurality of program threads executing together upon a processor which has a local memory. The program threads thus share the local memory. However, contention may still arise between the two threads, thus causing a reduction in processing efficiency. There is an additional cost in terms of data transfer if the two threads utilize different virtual memory addressing schemes, as the common data will 'ping-pong' between two different physical locations in the shared memory.

One approach for detecting the predetermined condition involves detecting the occurrence of a predetermined number of contenting atomic memory access requests to the common data. For example, the first time there is contention over common data, the contention detection circuitry may allow atomic memory access operations to be performed locally, as a small amount of 'ping-ponging' between the local memories may be acceptable. This is because transferring the common data to the shared memory and performing the atomic memory access operation upon the data in the shared memory also incurs a cost of its own. However, if there is further contention over the common data, corresponding to excess 'ping-ponging', the contention detection circuitry will trigger the switch to performing the atomic memory access operation in the shared memory.

The predetermined contention condition may also include the predetermined number of contending atomic memory access operations to occur in absence of any intervening non-atomic memory access requests to the common data.

The predetermined contention condition may also include the predetermined number of contending atomic memory access operations to occur within a predetermined time period.

The shared memory may store flag data which identifies the common data as being subject to contending atomic memory access requests. This flag data may also be used to determine whether the predetermined contention condition has occurred.

The shared memory may also store counter data indicative of a number of atomic memory access requests made to the common data. The counter may be used to monitor contention until it reaches a threshold where the contention count is determined to be too high. In response to the counter reaching the threshold, the contention detection circuitry can trigger the switch to performing the atomic memory access operation in the shared memory.

In some examples, the counter data may separately indicate a number of atomic memory access requests made to the common data by each of the plurality of memory access request sources.

In some examples, the local memory and the shared memory are a part of a cache memory hierarchy.

The atomic memory access operations may comprise, for example, atomic load operations, atomic store operations and atomic compare and swap operations.

In some examples, the shared memory comprises shared-memory processing circuitry. The shared-memory processing circuitry can be configured to perform operations on data stored within the shared memory, the operations including at least one of: an add operation; a logical or operation and a compare operation.

The plurality of memory access request sources may correspond to different processing threads.

FIG. 1 illustrates one example of a data processing apparatus 100, in which 'ping-ponging', or data thrashing in virtual memory systems, may occur. In particular, this can occur in systems which perform atomic operations. Atomic operations are those which are performed without an interruption between the start and the end of the operation. For example, if an atomic load is performed on a memory location, and during the atomic load that memory location is snooped, a snoop result will not be returned until the atomic load has completed.

The data processing apparatus 100 includes two CPUs, CPUA 102 which has a local cache A 106, and CPUB 104 which has local cache B 108. In the example of FIG. 1, threadA executing on CPUA 102 requires data X for an atomic operation. CPUA 102 first checks cache A 106 for data X. However, data X is not stored in cache A 106, and a cache miss occurs. Therefore, CPUA 102 then requests exclusive access of data X from the shared cache 110. The shared cache 110 provides data X and CPUA 102 can begin the atomic operation upon data X. The copy of data X in the shared cache 110 is marked as invalid as it is no longer the most up-to-date (recent) version of this data. During the atomic operation performed by CPUA 102, threadB running on CPUB 104 may also require data X from the shared cache 110, in which case another request for data X is made by CPUB 104. However, the copy of data X in the shared cache 110 is invalid. Therefore, the shared cache 110 snoops cache A 106 in an order to acquire data X. However, CPUA 102 is still performing an atomic operation on data X and so the shared cache 110 must wait for this to complete before a snoop result can be obtained.

Upon completion of the atomic operation, updated data X is sent back to the shared cache 110 in response to the previously received snoop request. The shared cache 110 can subsequently provide data X to cache B 108 of CPUB 104. This process involves a number of transmissions between the caches, which is referred to as 'ping-ponging', or in some systems as 'thrashing'. This number of transmissions requires processing resources which could otherwise be used elsewhere.

Figure 2:
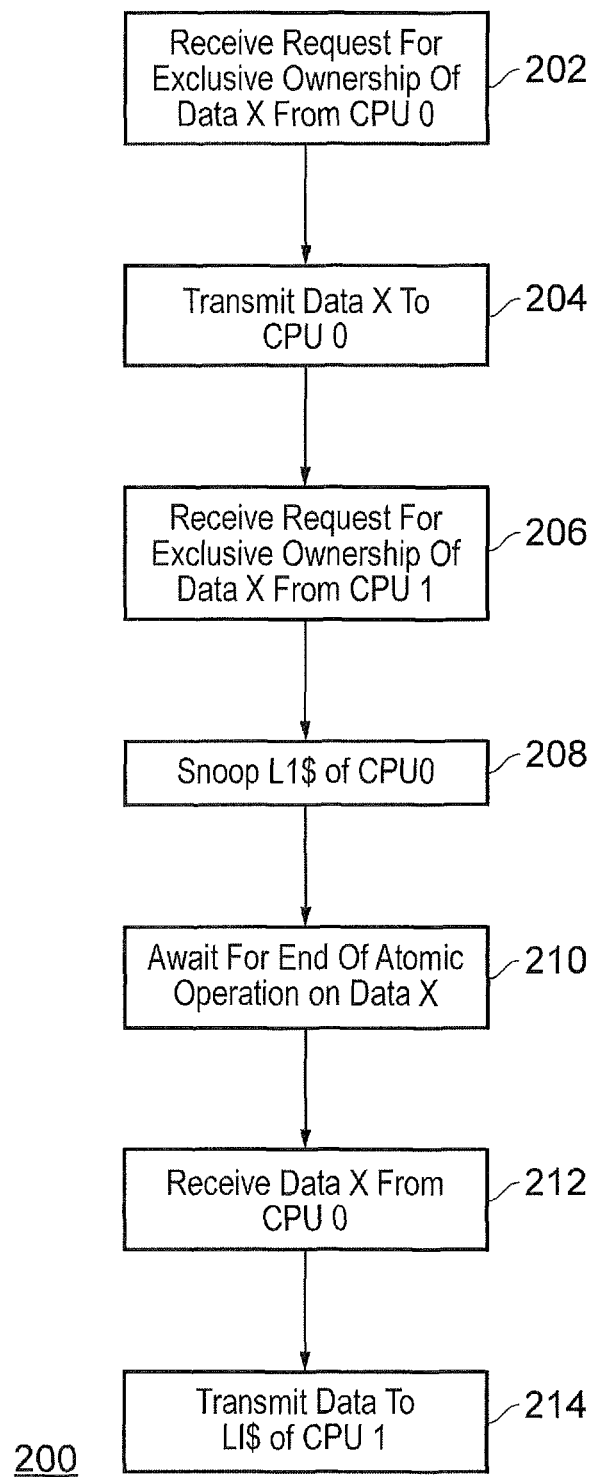
FIG. 2 schematically illustrates a process which can occur in a shared cache when 'ping-ponging' occurs.

FIG. 2 shows an example of the 'ping-ponging' with respect to the shared cache 110 of FIG. 1. In step 202 a request for exclusive ownership of data X is received from CPUA 102. In Step 204, CPUA 102 is provided with exclusive ownership of data X, and the copy of data X held in the shared cache 110 is invalidated. Following this, a further request for exclusive ownership of data X is received from CPUB 104 in step 206. This request cannot be immediately serviced because the shared cache 110 does not hold a valid copy of data X. Therefore, in step 208 the shared cache 110 snoops cache A 106 in order to obtain data X. However, CPUA 102 is in the middle of performing an atomic operation of data X, and so a snoop response is not initially returned to the shared cache 110. In step 210, the shared cache 110 waits for the atomic operation to finish and for updated data X to be received. It has been recognised that this step reflects a further cost to processing due to 'ping-ponging' because both the shared cache 110 and CPUB 104 may be stalled during this time whilst they wait for data X. In step 212, data X is received from CPUA 102, and in step 214 this data is transmitted to cache B 108 of CPUB 104. It has also been recognised that at least some of the data transfers in steps 204, 212 and 214 may be avoided in order to reduce the cost to processing resources.

Figure 3:
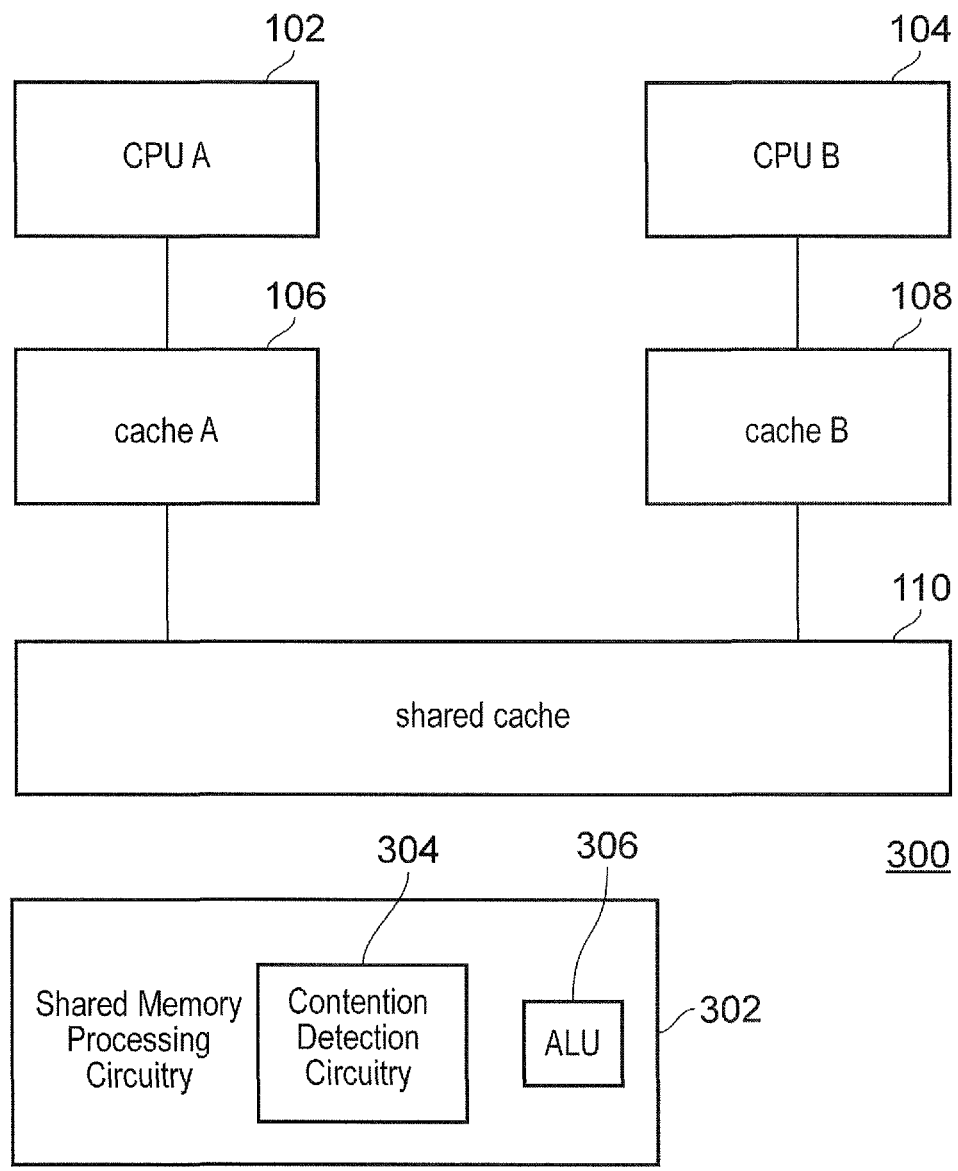
FIG. 3 schematically illustrates a data processing apparatus according to one example embodiment of the present disclosure.

FIG. 3 shows one example of data processing apparatus 300 according to the present technique. The data processing apparatus 300 includes two CPUs, CPUA 102 and CPUB 104, each of which also have a local cache, cache A 106 and cache C 108 respectively. The two CPUs also have access to a shared cache 110.

The data processing apparatus 300 of FIG. 3 further comprises shared memory processing circuitry 302 to reduce the amount of 'ping-ponging' data between cache A 106 and cache B 108. The shared memory processing circuitry 302 includes contention detection circuitry 304 which monitors data in cache A 106, cache B 108 and the shared cache 110. The contention detection circuitry 304 may also monitor requests for data from CPUA 102 and CPUB 104. When the contention detection circuitry 304 determines that data may begin to 'ping-pong', or that data is already 'ping-ponging', the shared memory processing circuitry 302 takes over processing of that data. Instead of successively transmitting the data to each of cache A 106 and cache B 108 for processing, the data is stored in the shared cache 110, where the shared memory processing circuitry 302 and the ALU 306 can perform the desired atomic operations. In this way, the number of transmissions of the data is reduced, which reduces the amount of processing resources expended. The efficiency of CPUA 102 and CPUB 104 is also improved as they are less likely to be stalled whilst awaiting data that is undergoing an atomic operation by the other.

Figure 4:
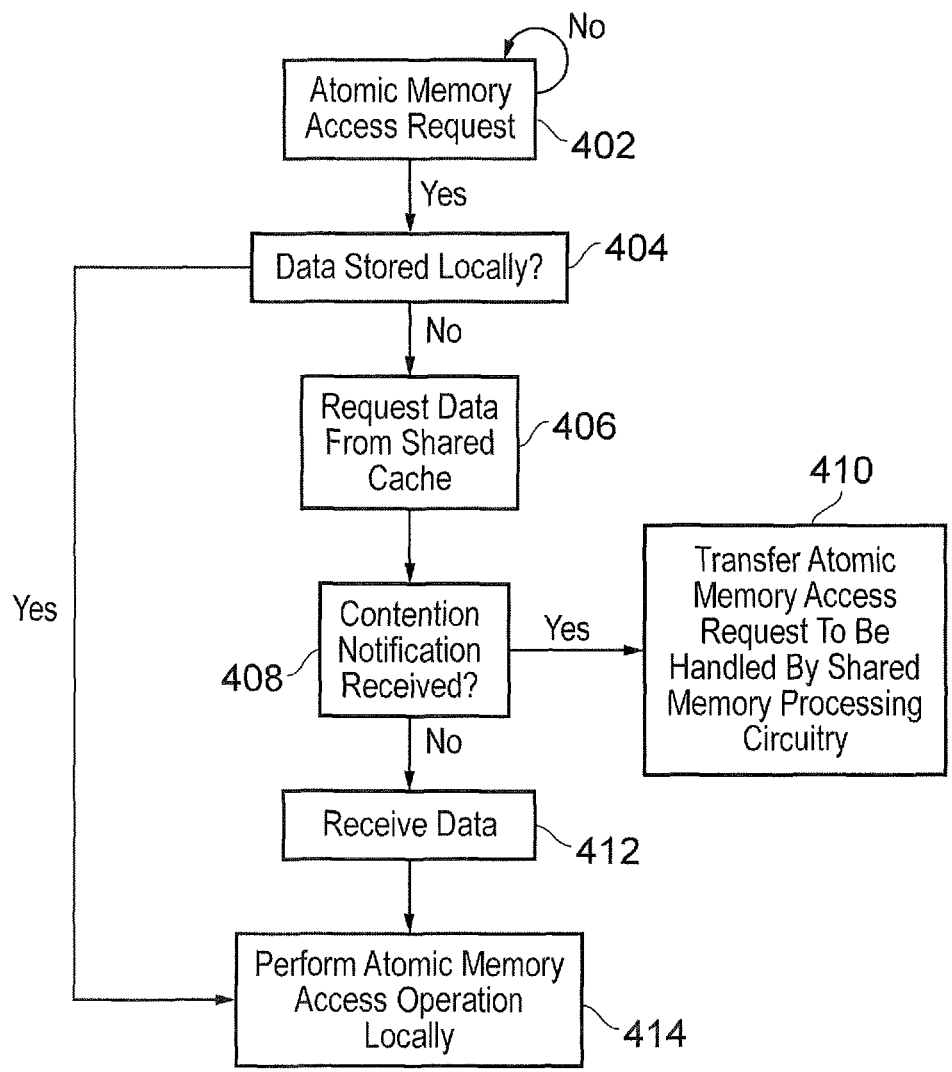
FIG. 4 illustrates a method of making an atomic memory access request from a CPU.

FIG. 4 shows a process which may be performed by one of the CPUs of the data processing apparatus 300 of FIG. 3. In step 402 CPUA 102 generates an atomic memory access request. It is first checked in step 404 whether the required data is stored in the local cache A 106. If this is the case, then processing advances to step 414, and the atomic memory access operation is performed locally.

If the data is not stored locally, then the process moves to step 406, where a request for the data is sent to the shared cache 110. At this point, if there is contention with CPUB 104, CPUA 102 will receive a contention notification from the contention detection circuitry 304, as shown in step 408. In such a situation, the CPUA 102 transfers the atomic memory access request to the shared memory processing circuitry 302 as shown in step 410.

If a contention notification is not received, then at step 412 the data is received from the shared cache 110. CPUA 102 is then able to perform the atomic memory access operation locally in step 414.

It will be appreciated that the process of FIG. 4 is only one example of the present technique. Other systems may employ a different data scheme in which data may be stored at various locations in either an owned or a shared state, depending on whether that data is also stored elsewhere. In these examples, CPUA 102 not only needs the requested data to be stored locally in order to perform the atomic memory access operation, but also requires it in an owned state. Similarly, the situation may arise in step 402 where requested data is stored locally but is in a shared state, in which case CPUA may request exclusive access of the data to secure it in an owned state to perform the atomic memory access operation. Such requests being received from a plurality of CPUs is another example of contention according to the present technique.

Figure 5:
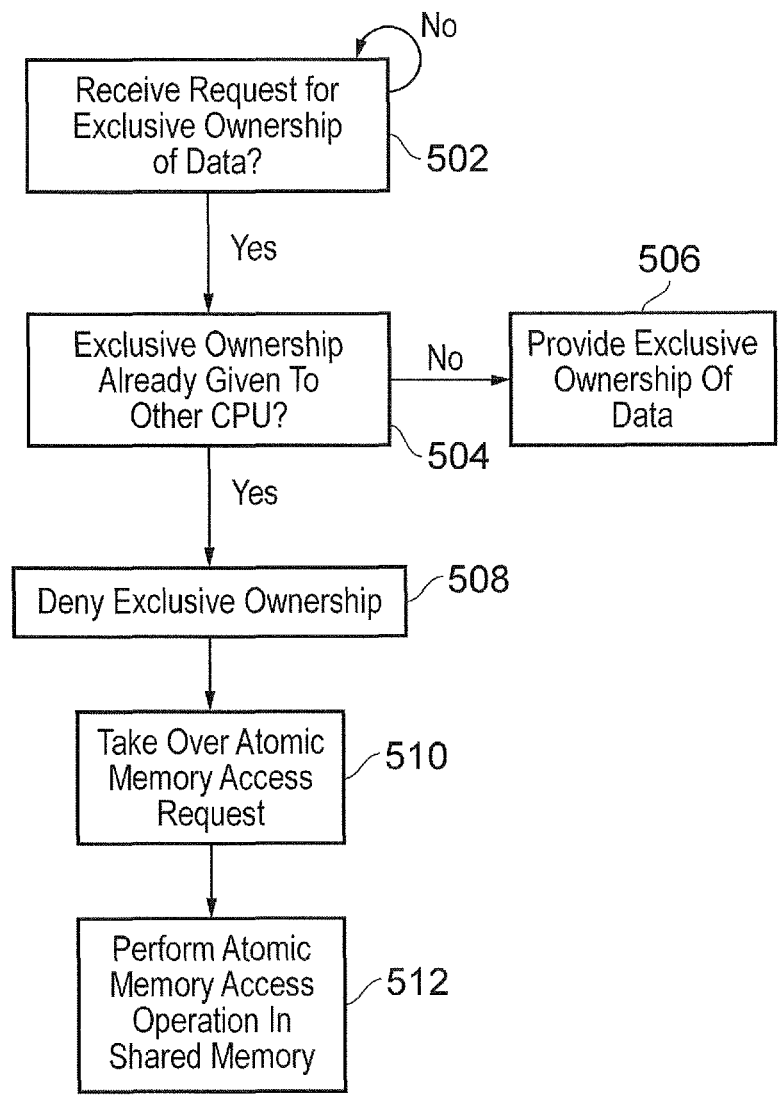
FIG. 5 illustrates a method of receiving an atomic memory access request and detecting contention with contention detection circuitry.

FIG. 5 shows one example of the present technique with respect to the shared memory processing circuitry 302. In step 502, the shared memory processing circuitry 302 awaits a request for exclusive ownership of data from a CPU (a request that the CPU should own the data). If such a request is received, and the request indicates that it is for an atomic memory access operation, then in step 504 the contention detection processing circuitry 304 checks whether exclusive ownership over the concerned data has already been given to another CPU. If it has not, exclusive ownership can be provided in step 506. However, if exclusive ownership has been provided to another CPU, then the requesting CPU is denied exclusive ownership at step 508. In step 510 the shared memory processing circuitry takes over the atomic memory access request. This can include storing the data, in an owned state, in the shared cache 110. In step 512 the atomic memory access operation is performed on the data stored in the shared memory. This reduces the chance of subsequent 'ping-ponging' of data between the local caches of the CPUs.

FIG. 6 shows one example of the parameters monitored by the contention detection circuitry 304. As can be seen, for each cache line of the shared cache, the contention detection circuitry records whether an atomic memory access request has been made for the line in the form of an atomic request flag. The contention detection circuitry also records the current owner of the data stored in the line. For line 0, no atomic memory access requests have been made, and the data is not currently owned by a specific device. Should an atomic memory access request be received for the data in line 0, the request will be granted, and the requesting device will be provided with exclusive ownership over line 0. On the other hand, as can also be seen from FIG. 6, the data in line 1, and line 2, has been subject to atomic memory access operations, and is currently owned by CPUA. Any atomic memory access requests for lines 1 or 2 received from a CPU other than CPUA will thus indicate contention. When this occurs, the contention detection circuitry triggers the switch of processing of the data corresponding to lines 1 or 2 by CPUA to processing of the data by the shared memory processing circuitry 302. The data may also be moved from the local cache A 106 of CPUA 102 to the shared memory 110. The data in line 3 is owned by CPUB, but has not been the subject of any atomic memory access operations. If a CPU other than CPUB makes an atomic memory access request for the data in line 3, this will not indicate contention, and exclusive ownership over line 3 may be transferred to a CPU other than CPUB. The atomic request flag column may be cleared periodically after a predetermined number of clock cycles or a predetermined amount of time. Similarly, the atomic request flag corresponding to a specific line may be cleared when a non-atomic memory access request is made for that line.

FIG. 7 shows another example of the parameters monitored by the contention detection circuitry 304. In this example the contention detection circuitry stores 304 stores a count value corresponding to the number of atomic memory access requests made for each line in the shared cache 110. In this case it is not necessary to store a record of the owner of each line because two contiguous requests for the same line will not be received from the same CPU. The contention detection circuitry also stores a programmable threshold value 'P', which can be configured to be any value. When a count value corresponding to any line exceeds 'P', it is determined that there is contention over that line. The data of that line will accordingly be stored in the shared cache 110 in an exclusive form, and any atomic memory access operations will be performed by the shared memory processing circuitry 302.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. A method of processing data, comprising:
storing data in a shared memory;
generating memory access requests with a plurality of a memory access request sources, each having a local memory to store data to be accessed, at least some of said memory access requests being atomic memory access requests corresponding to atomic memory access operations unobservable in a partially completed form;
detecting a predetermined contention condition between atomic memory access requests, generated by differing ones of said plurality of memory access request sources, to common data; and
in response to detecting said predetermined contention condition, triggering a switch from performing an atomic memory access operation of a memory access request source of said plurality of memory access request sources upon said common data stored within a local memory of said memory access request source to performing said atomic memory access operation upon said common data stored in a shared memory.

2. A computer program product storing in non-transitory form a computer program for controlling a computer to provide the method of claim 1.

3. Apparatus for processing data, comprising:
a shared memory;
a plurality of memory access request sources to generate memory access requests, each having a local memory to store data to be accessed, at least some of said memory access requests being atomic memory access requests corresponding to atomic memory access operations unobservable in a partially completed form; and
contention detection circuitry to detect a predetermined contention condition between atomic memory access requests, generated by differing ones of said plurality of memory access request sources, to common data; wherein
when said contention detection circuitry detects said predetermined contention condition, said contention detection circuitry is configured to trigger switching from performing an atomic memory access operation by a memory access request source of said plurality of memory access request sources upon said common data stored within said local memory of said memory access request source to performing said atomic memory access operation upon said common data stored in said shared memory.

4. Apparatus as claimed in claim 3, wherein said switching includes storing said common data in an exclusive form within said shared memory.

5. Apparatus as claimed in claim 3, wherein said plurality of memory access request sources comprise a plurality of processors to execute respective program instructions.

6. Apparatus as claimed in claim 3, wherein said plurality of memory access request sources comprise a plurality of program threads executing together upon a processor and sharing said local memory.

7. Apparatus as claimed in claim 3, wherein said predetermined contention condition comprises occurrence of a predetermined number of contending atomic memory access requests to said common data.

8. Apparatus as claimed in claim 7, wherein said predetermined contention condition comprises occurrence of said predetermined number of contending atomic memory access requests to said common data in absence of any intervening non-atomic memory access requests to said common data.

9. Apparatus as claimed in claim 7, wherein said predetermined contention condition comprises occurrence of said predetermined number of contending atomic memory access requests to said common data within a predetermined time period.

10. Apparatus as claimed in claim 3, wherein said shared memory stores flag data identifying said common data as being subject to contending atomic memory access requests.

11. Apparatus as claimed in claim 3, wherein said shared memory stores counter data indicative of a number of atomic memory access requests made to said common data.

12. Apparatus as claimed in claim 3, wherein counter data separately indicates a number of atomic memory access requests made to said common data by each of said plurality of memory access request sources.

13. Apparatus as claimed in claim 3, wherein said local memory and said shared memory are part of a cache memory hierarchy.

14. Apparatus as claimed in claim 3, wherein said atomic memory access operations include atomic load operations, atomic store operations and atomic compare and swap operations.

15. Apparatus as claimed in claim 3, wherein said shared memory comprises shared-memory processing circuitry to perform at least one of:
an add operation upon said data stored within said shared memory;
a logical operation upon said data stored within said shared memory; and
a compare operation upon said data stored within said shared memory.

16. Apparatus as claimed in claim 3, wherein at least two of said plurality of memory access request sources correspond to different processing threads.

17. Apparatus for processing data, comprising:
shared memory means for storing data;
a plurality of memory access request source means for generating memory access requests, each having a local memory means for storing data to be accessed, at least some of said memory access requests being atomic memory access requests corresponding to atomic memory access operations unobservable in a partially completed form; and
contention detection means for detecting a predetermined contention condition between atomic memory access requests, generated by differing ones of said plurality of memory access request source means, to common data; wherein
when said contention detection means detects said predetermined contention condition, said contention detection means is configured to trigger switching from performing an atomic memory access operation of a memory access request source means of said plurality of memory access request source means upon said common data stored within said local memory means of said memory access request source means to performing said atomic memory access operation upon said common data stored in said means for shared memory means.

\* \* \* \* \*